(12) United States Patent
Harness et al.

(10) Patent No.: US 7,192,458 B1
(45) Date of Patent: Mar. 20, 2007

(54) PROCESS, CONTROL SYSTEM AND APPARATUS FOR THE DISTRIBUTION OF AIR IN A FUEL CELL/FUEL PROCESSOR SYSTEM

(75) Inventors: John R. Harness, Elgin, IL (US); Gavin P. Towler, Barrington, IL (US); Kurt M. Vanden Bussche, Lake in the Hills, IL (US); John J. Senetar, Naperville, IL (US); Daniel R. Sioui, Arlington Heights, IL (US)

(73) Assignee: HyRadix Incorporated, Des Plaines, IL (US)

( * ) Notice: Subject to any disclaimer, the term of this patent is extended or adjusted under 35 U.S.C. 154(b) by 588 days.

(21) Appl. No.: 10/347,926

(22) Filed: Jan. 17, 2003

Related U.S. Application Data

(63) Continuation-in-part of application No. 09/815,189, filed on Mar. 22, 2001, now abandoned.

(51) Int. Cl.
*B01J 3/24* (2006.01)

(52) U.S. Cl. .......... 48/61; 48/198.1; 48/198.6; 48/127.9; 429/25; 429/38; 429/12; 429/17

(58) Field of Classification Search ............ 48/61, 48/127.9, 198.1, 198.6; 429/25, 38, 12, 17
See application file for complete search history.

(56) References Cited

U.S. PATENT DOCUMENTS

| | | | |
|---|---|---|---|
| 3,909,299 A | 9/1975 | Corrigan | 136/86 C |
| 4,479,925 A | 10/1984 | Shires et al. | 423/359 |
| 5,290,641 A | 3/1994 | Harashima | 429/17 |
| 5,520,533 A | 5/1996 | Vrolijk | 431/90 |
| 5,997,280 A | 12/1999 | Welz, Jr. et al. | 431/90 |
| 6,569,551 B2 * | 5/2003 | Skala et al. | 429/17 |
| 6,887,286 B1 * | 5/2005 | Taki et al. | 48/197 R |
| 2003/0203257 A1 * | 10/2003 | Keskula et al. | 429/25 |

* cited by examiner

*Primary Examiner*—Glenn Caldarola
*Assistant Examiner*—Vinit H. Patel
(74) *Attorney, Agent, or Firm*—Pauley Petersen & Erickson

(57) ABSTRACT

A process, control system and apparatus for controlling the air side flows to the major components of a fuel processor apparatus are provided. The control system employs a multi-capacity blower provides process air to a partial oxidation reactor and a preferential oxidation reactor. The multi-capacity blower preferably provides a portion of the process air through a control valve to the partial oxidation reactor and the remaining portion of the process air is passed through a flow restrictor to supply process air to the preferential oxidation reactor. The control system of the present invention is simple, low cost and reliable.

16 Claims, 2 Drawing Sheets

PROCESS, CONTROL SYSTEM AND APPARATUS FOR THE DISTRIBUTION OF AIR IN A FUEL CELL/FUEL PROCESSOR SYSTEM

REFERENCE TO RELATED APPLICATIONS

This is a continuation-in-part of U.S. patent application Ser. No. 09/815,189, filed Mar. 22, 2001, now abandoned herein incorporated by reference in its entirety.

FIELD OF THE INVENTION

The present invention is a process which relates generally to the operation of a fuel processor which converts a hydrocarbon or oxygenate into a fuel stream and to the operation of an integrated fuel processor/fuel cell. More particularly, the invention relates to a process, control system and apparatus for the distribution of air to the fuel processor.

BACKGROUND OF THE INVENTION

The need for an efficient, non-polluting power source for vehicles and stationary power plants in urban environments has resulted in increased attention to the option of fuel-cell systems of high efficiency and low emissions. Hydrogen is the most suitable fuel for a fuel cell system, providing the highest conversion efficiency for fuel-on-board-to-electric-power for vehicular systems and generating zero emissions since water is the only product of the hydrogen/air fuel cell process. In the hydrogen/air fuel cell, the processes at the anode and cathode, respectively, are:

$$H_2 = 2H^+ + 2e \text{ (anode process)} \quad (1)$$

and, $$O_2 + 4e + 4H^+ = 2H_2O \text{ (cathode process)} \quad (2)$$

Hydrogen fuel could be carried on board the vehicle or stored as either neat hydrogen, in the form of pressurized gas or cryogenically stored liquid, or in the form of a more ordinary liquid fuel, such as methanol or liquid hydrocarbon, which needs to be processed/converted on board the vehicle to a mixture of hydrogen and $CO_2$. Because hydrogen is difficult or expensive to store, it likely that fuel processors will be employed to convert hydrocarbons or oxygenates to hydrogen for vehicle and for stationary power generation systems in an integrated fuel processor/fuel cell system.

Hydrogen may be produced from hydrocarbons or oxygenates in a fuel processor zone which generally consists of a steam reforming zone, a steam reforming zone and a partial oxidation zone (secondary reforming) or autothermal reforming zone (partial oxidation and steam reforming) to convert the hydrocarbon or oxygenate feed stream into a synthesis gas stream. Modifications of the simple steam reforming processes have been proposed to improve the operation of the steam reforming process. In particular, there have been suggestions for improving the energy efficiency of such processes in which the heat available from the products of a secondary reforming step is utilized for other purposes within the synthesis gas production process. For example, processes are described in U.S. Pat. No. 4,479,925 B1 in which heat from the products of a secondary reformer is used to provide heat to a primary reformer.

The reforming reaction is expressed by the following formula:

$$CH_4 + 2H_2O \rightarrow 4H_2 + CO_2$$

where the reaction in the reformer and the reaction in the shift converter are respectively expressed by the following simplified formulae (3) and (4):

$$CH_4 + H_2O \rightarrow CO + 3H_2 \quad (3)$$

$$CO + H_2O \rightarrow H_2 + CO_2 \quad (4)$$

Because formula (3) will produce CO, and CO can be detrimental to the operation of the fuel cell, a series of CO removal steps may be included in a fuel processor zone. One of the most common CO removal or hydrogen purification steps is a water gas shift conversion zone. In the water gas shift conversion zone which typically follows a reforming step, formula (4) is representative of the major reaction.

If it is required to reduce the CO concentration to very low levels, such as less than 50 ppm mol, or less than 10 ppm mol, a preferential oxidation step may follow the water gas shift step. In the preferential oxidation step, the hydrogen fuel stream at effective conditions is contacted with a selective oxidation catalyst in the presence of an oxygen containing stream to selectively oxidize carbon monoxide to carbon dioxide and produce a fuel stream comprising between about 10 and 50 ppm-mol carbon monoxide. The thus purified fuel stream is passed to an anode side of the fuel cell and an air stream is passed to the cathode side of the fuel cell.

Others have attempted to combine the operation of a fuel cell and a fuel processor by thermally integrating these components and supplying the heat requirements of the fuel processor by integrating the endothermic steam reforming reaction zone with exothermic zones including reaction zones for partial oxidation and combustion zones. Generally, the focus of the prior developments was on the distribution of fuel to these zones in order to balance the essentially static operation of the combined system. By the term "essentially static operation", it is meant that the output of electric power from the fuel cell varies by less than about 5 to 10 percent. Ancillary equipment, such as an air compressor or blower is required to supply air to the air consuming zones of the process. The air consuming zones of the combined fuel cell/fuel processor system generally include a combustion zone for burning an anode waste gas stream from the fuel cell to provide heat to an endothermic reaction zone and a partial oxidation zone for converting a portion of the feed stream to produce the fuel stream for the fuel cell. A conventional approach to supplying the air to these zones would result in a very complex and expensive arrangement of compressors, valves, and sensors for each air consuming zone. Air distribution methods are sought to supply air to air consuming zones of integrated fuel processor/fuel cell systems which is consistent with low complexity and high reliability.

SUMMARY OF THE INVENTION

The present invention relates to a simplified method and apparatus for distributing air to a fuel processor wherein at least two air consumption zones, a reaction zone and a preferential oxidation zone, require that the air be delivered according to the demand for hydrogen at conditions which are consistent with the requirements of the air consumption zones. In the reaction zone, a portion of a fuel processor feed stream in the presence of steam is oxidized to produce a hydrogen containing stream which also contains carbon monoxide ("partial oxidation"); and, in the preferential oxidation zone, a portion of the carbon monoxide in the hydrogen containing stream is selectively oxidized to carbon dioxide to produce a stream containing less than about 50 ppm carbon monoxide which is advantageous as a fuel cell feed. Applicants discovered a problem in the operation of an integrated fuel processor and fuel cell system wherein carbon monoxide concentration peaks are produced when there is an increased demand for hydrogen, e.g., electric power when integrated with a fuel cell. The control system of the present invention provides a method for anticipating these peaks and thus avoid damage to a fuel cell if the hydrogen is used as a feed stream to a fuel cell. The present invention provides an inexpensive and reliable system for distributing air to these air consuming zones without creating an unstable air control problem in the reaction zone. Air may also be supplied to a combustion or burner zone, e.g., for the combustion of anode waste gas. In the combustion zone, air and anode waste gases from the fuel cell are mixed and burned to provide hot exhaust gases to generate steam or heat reaction zones in the fuel processor.

In one embodiment, the present invention comprises a fuel processor control for a hydrogen production apparatus. The apparatus includes a partial oxidation reactor and a preferential oxidation reactor. The control system comprises at least one of a hydrogen demand sensor which is operable to produce a hydrogen demand signal and a reactor temperature sensor which is operable to measure the partial oxidation temperature and produce a reactor temperature signal. A multi-capacity blower which has a feed inlet for receiving a process air stream and a feed outlet for producing the process air flow at a plurality of fixed air flow rates is provided to supply the process air flow at incrementally fixed flow rates in response directly or indirectly to a demand for hydrogen. A first conduit is provided for connecting the feed outlet of the multi-capacity blower to the partial oxidation reactor. A second conduit is provided for connecting the feed to the preferential oxidation reactor. A reactor air control valve is provided in at least one of the first conduit and second conduit which has a valve inlet for receiving a portion of the process air flow, a valve outlet, and a control body for adjusting the portion of the process air flow in response directly or indirectly to the hydrogen demand.

In another embodiment, the present invention comprises a fuel processor control apparatus for an integrated hydrogen production and fuel cell apparatus. The apparatus includes a partial oxidation reactor; an anode waste gas burner; and a preferential oxidation reactor. A burner air conduit is provided for supplying a burner air flow to the anode waste gas burner. The burner air flow is variable in response to a burner outlet temperature. A process air conduit is provided for supplying a process air flow to the partial oxidation reactor and the preferential oxidation reactor. The control system comprises a burner temperature sensor which is operable to measure the burner outlet temperature and produce a burner signal; a reactor temperature sensor which is operable to measure the partial oxidation temperature and produce a reactor temperature signal; and a variable speed blower which has an inlet for receiving air and an outlet for producing the burner air flow at an effective burner air flow rate to maintain the burner outlet temperature in response to the burner signal. A first conduit is provided for connecting the outlet of the variable speed blower to the burner air conduit. A multi-capacity blower which has a feed inlet for receiving a process air stream and a feed outlet for producing the process air flow at a plurality of fixed air flow rates is provided to supply the process air flow at incrementally fixed flow rates in response to a demand for hydrogen. A reactor air control valve is provided which has a valve inlet for receiving a portion of the process air flow, a valve outlet for providing said portion of the process air flow to the partial oxidation reactor, and a control body for adjusting the portion of the process air flow in response to the reactor temperature signal. A second conduit is provided for connecting the feed outlet of the multi-capacity blower to the reactor control valve. A third conduit is provided for connecting the second conduit to the preferential oxidation reactor, the third conduit containing a flow restrictor.

DETAILED DESCRIPTION OF THE INVENTION

Figure 1:
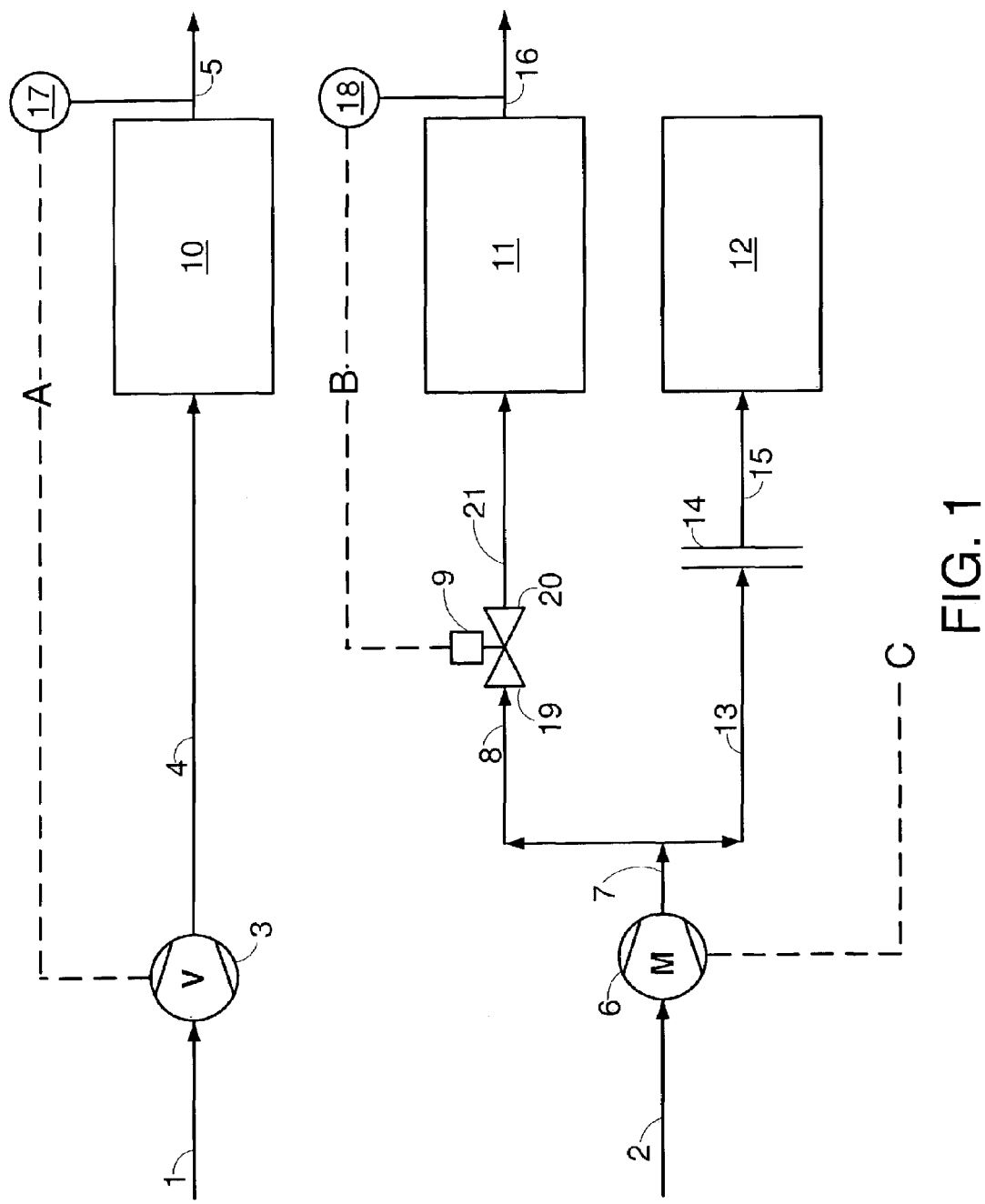
FIG. 1 is a schematic block diagram illustrating the present invention.

In the process of producing electricity from an integrated fuel processor and fuel cell, a hydrocarbon or oxygenate feedstock is converted to hydrogen and the hydrogen is passed to the fuel cell to produce the electric power. Air is employed at various points in the integrated fuel processor and fuel cell as a reactant in the catalytic zones of the fuel processor and on the cathode side of the fuel cell. By the term "air" as used herein, ambient air as well as air enriched or depleted in oxygen is contemplated. Enriched air is advantageous for the partial oxidation reactor and the preferential oxidation reactor, whereas air depleted in oxygen may be used for combustion. When enriched, the air may contain up to 90 or 95 volume percent oxygen; however, significant benefits can be obtained with air enriched up to 50, even only up to 30 or 35, volume percent oxygen. Air depleted in oxygen often contains at least 5, and sometimes at least 10, volume percent oxygen.

A major consumer of air in the fuel processor is in a partial oxidation reactor which may be a partial oxidation reactor in advance of a steam reformer or a combined partial oxidation and steam reformer reactor or autothermal reformer reactor. In the partial oxidation zone, or prior to the partial oxidation process, air is admixed with the effluent from a pre-reforming zone or with a portion of the feedstock stream and oxidized over a partial oxidation catalyst at effective partial oxidation conditions to convert the feedstock stream or the effluent from the pre-reforming zone to an oxidation effluent stream comprising hydrogen, carbon dioxide, carbon monoxide and water. The amount of process air introduced to the partial oxidation reactor will effect the degree or extent of conversion which takes place in the partial oxidation reactor and will establish the temperature of the partial oxidation reactor. Preferably, an effective amount of process air is passed to the partial oxidation zone to maintain the effluent temperature of the effluent from partial oxidation reactor less than about 850° C. More preferably, an effective amount of process air is passed to the partial oxidation reactor to maintain the effluent temperature of the effluent from the partial oxidation reactor between about 650° and about 850° C.

Another use for process air in the fuel processor of the present invention is in a preferential oxidation reactor for the selective oxidation of carbon monoxide to carbon dioxide.

Too much process air in the preferential oxidation reactor will result in the loss of hydrogen and too little process air in the preferential oxidation reactor will allow the carbon monoxide concentration in the hydrogen fuel to rise. As stated above, when the hydrogen is used as a feed to a fuel cell, carbon monoxide can poison the fuel cell, and therefore the flow of process air to the preferential oxidation reactor must be controlled.

In the fuel processor, air is combined with anode waste gas or a fuel stream and burned in a burner zone to recover or provide heat to reforming zones which undergo endothermic reactions in the presence of steam to convert at least a portion of the feedstock to hydrogen and carbon monoxide. Accordingly, the burner temperature or the temperature of the effluent gases from the burner zone is controlled by adjusting the flow of air to the burner. The burner effluent gases, or exhaust gases, are used to provide heat to reforming zones, generate steam or combinations thereof. Preferably, an effective amount of excess burner air (i.e., air in excess of the stoichiometric amount of air required for combustion) is provided to maintain the burner temperature at less than about 850° C., and more preferably between about 600° and about 750° C. The operation of the anode waste gas burner can be controlled by measuring the burner outlet or effluent temperature and adjusting a variable speed blower to provide an effective amount of burner air to maintain the desired burner outlet temperature. Thus, burner air is provided to the burner with a minimum loss of power by directly matching the amount of air compression to the burner requirements.

One problem in operating a fuel processor or an integrated fuel processor/fuel cell system is that each of the above air consuming reaction zones respond at different rates to changes or adjustments in the demand for hydrogen (electric power when integrated with a fuel cell) and the corresponding adjustment to the feed rate which is the rate the feedstock is passed to the fuel processor. This is further complicated by the thermal integration of the fuel processor components such as the partial oxidation reactor and any downstream reaction zone such as a water gas shift zone which may be employed in the generation of steam. It was unexpectedly discovered in the operation of the fuel processor that upon increasing the feed rate, two carbon monoxide concentration peaks appeared in the hydrogen fuel. The first carbon monoxide peak occurred as soon as the feed rate was increased, and the second carbon monoxide peak appeared at some time following the establishment of the new feed rate and corresponding air capacity to the partial oxidation reactor. While not wanting to be bound by any particular theory, it is believed that the first carbon monoxide peak resulted from a space velocity change as a direct result of the change in the feed rate and air rate corresponding to the new higher feed rate. It is believed that the second carbon monoxide concentration peak resulted because the feed rate change altered the steam to carbon ratio in the feedstock introduced to the partial oxidation reactor. That is, when the hydrocarbon feed rate is increased in response to an increase in demand for hydrogen or electric power, there is a transient induced delay in supplying a sufficient amount of steam to maintain the steam to carbon ratio at a constant level. As a result, until the steam production is increased, the carbon monoxide production increases in the partial oxidation reactor. One solution to this problem of the second carbon monoxide concentration peak would be to provide more steam to admix with the feedstock, but in a isolated fuel processor or integrated fuel processor/fuel cell system, extra steam is not available.

Applicant discovered that the first carbon monoxide concentration peak could be minimized, or essentially eliminated by anticipating the increase in demand for hydrogen (or electric power in the case of an integrated fuel processor/fuel cell system) and providing an increased amount or capacity of the air passed to the preferential oxidation reactor prior to the preferential oxidation reactor receiving the process stream resulting from the increase in the feed rate of the hydrocarbon feedstock. The increase in air supply may be simultaneous with the increase in feedstock feed rate (and the lag time as the gases pass through the partial oxidation reactor enable the increase to occur prior to the processing in the preferential oxidation reactor) or may be prior to the increase in feedstock feed rate. The amount of this air rate increase is consistent with the higher feed rate demanded by the increased hydrogen or electric power demand. The second carbon monoxide concentration peak is minimized, or essentially eliminated by further increasing the amount of air passed to the preferential oxidation reactor by an incremental amount for an effective period of time to compensate for the delay in the steam production.

In the present invention, the process air supplied to the partial oxidation reactor and the preferential oxidation reactor is provided by using a multi-capacity blower. The multi-capacity blower is operated at discrete capacity settings consistent with a fixed percentage of its capacity. The multi-capacity blower may be continuously variable over its range of operation or may be designed to vary in steps. Regardless of the design of the multi-capacity blower, the capacity should be adjustable to a fixed, discrete capacity. In order to provide a consistent and reliable control system, a dead time band is preferably established about each fixed percentage (i.e., discrete capacity setting) of the total blower capacity to avoid rapid swings in blower speed for minor changes in overall demand for hydrogen or electric power as the case may be. In anticipation of the transient peak of carbon monoxide which would otherwise occur on increasing the multi-capacity blower capacity to the next highest setting. Preferably, the dead band is as small as possible without being so small that oscillations in blower capacity can occur.

The preferred processes of this invention overcompensate in air supply to the preferential oxidation reactor in an initial response to an increase in production rate. The overcompensation often is in amount of at least about 0.5, say, at least about 1, and sometimes between about 2 and 10, volume percent more air than would be supplied to the preferential oxidation reactor to maintain the carbon monoxide in the preferential oxidation reactor effluent at a desired concentration. The overcompensation may be accomplished in any suitable manner. Typically, it is accomplished by increasing the multi-capacity blower capacity in an amount sufficient to provide the overcompensation for a period of time until the second carbon monoxide transient concentration peak had passed, and then returning the multi-capacity blower capacity to the appropriate higher level. This period of time can readily be determined by the artisan. Often, the overcompensation occurs for a period of less than about 30, sometimes less than about 5, minutes. In this manner, the preferential reactor is able to maintain the carbon monoxide concentration below a point which would, for instance, adversely impact the fuel cell.

The carbon monoxide peaks only occur on increasing the multi-capacity blower capacity. No carbon monoxide peaks are typically observed on reducing multi-capacity blower capacities in response to decreased in hydrogen demand or electric power demand, as the case may be.

The fixed, incremental output of the multi-capacity blower is set directly or indirectly by the hydrogen demand or electric demand, in the case of an integrated fuel processor/fuel cell system. When the electric demand is used, typically, the established demand reflects not only the amount of electricity to be supplied but also the efficiency of the fuel cell. Indirect control is generally effected through determining the temperature of the partial oxidation reactor or effluent and adjusting the multi-capacity blower to an appropriate fixed setting to achieve a temperature in the desired range. A combination of direct and indirect control can also be used.

The relative portions of the air from the multi-capacity blower going to the partial oxidation reactor and the preferential oxidation reaction can be controlled in any convenient manner. For instance, control valves may be used in the supply conduits to each reactor. Most preferably, the apparatus uses a combination of a control valve for metering a portion of the process air to the partial oxidation reactor and a flow restrictor for further controlling the remaining amount of process air delivered to the preferential oxidation reactor.

The use of a multi-capacity blower operating at a plurality of discrete speeds avoids the control instability problem in the partial oxidation reactor. The flow controller of the air passed to the partial oxidation reactor will constantly attempt to compensate for a fluctuating supply pressure while also attempting to control the temperature of the partial oxidation reactor. According to the preferred aspects of the present invention, the use of discrete blower speeds still requires the oxidation reactor control valve to compensate for the new upstream process air header pressure on each speed change, but the flat blower capacity following the change would enable the partial oxidation air flow controller to regain control of the air flow to the partial oxidation reactor at the new condition. The choice of the appropriate blower capacity depends on how much hydrogen combustion can be tolerated in the preferential oxidation reactor. In general, the more speed choices provided, the more efficient the system, but also the more likely it is to cause control issues with the reactor air valve. It is preferred that the multi-capacity blower operation comprise at least three discreet speed settings. For example, the multi-capacity blower could use discrete speeds or switch points, permitting blower capacities such as 0%, 40%, 55%, 75%, 100% to provide for limited switching. Most preferably, a continuously variable multi-capacity blower is used which is capable of operating at fixed, discrete capacities.

A dead time band, which delays the time at which the element becomes aware of a change in the signal, in the control scheme is preferable to avoid unnecessary cycling about normal operating capacities. This dead time band avoids frequent switching of the multi-capacity blower particularly when the feed is hovering near a switch point. For example, if the demand for hydrogen drops from 100 percent to below 70 percent, the multi-capacity blower is switched to 75 percent of capacity. If the demand for hydrogen then rises above 75 percent, the multi-capacity blower would only be returned to 100 percent capacity after the demand for hydrogen has exceeded 80 percent. This corresponds to a 5 percent dead time band. Preferably, the multi-capacity blower is operated with a dead time band at each of the individually discrete levels of blower capacity which corresponds to less than about 5 percent capacity about the current operating level. Thus, according to the present invention, a dead time band is established which permits a relatively constant operation when the hydrogen demand is fluctuating between 74 and 76 percent, because the multi-capacity blower speed is not frequently switching between 100 and 75 percent. Such frequent switching would result in unstable control issues which the control system of the present invention intends to avoid.

Thus, the control system of the present invention provides fuel processors and integrated fuel processor/fuel cell systems with a minimum amount of parasitic power and a minimum number of control instruments while avoiding unstable process control regions.

DETAILED DESCRIPTION OF THE DRAWINGS

The invention will be further described with reference to FIG. 1. An air stream in line 1 is passed to a variable speed blower 3 to provide a burner air stream in a first conduit 4 which supplies the burner air flow to an anode waste gas burner 10. In the anode waste gas burner 10, the anode waste gas from the anode side of the fuel cell is burned in the presence of the burner air flow which is either mixed with the anode waste gas stream prior to entering the anode waste gas burner 10 or admixed in the anode waste gas burner 10. The combustion of the anode waste gas stream in the presence of the burner air flow results in a burner temperature which is measured in a burner temperature sensor 17, measuring the temperature of the burner effluent stream in conduit 5. It is desired to maintain the burner temperature in a range between about 600° to about 850° C., and more preferably, it is desired to maintain the burner outlet temperature in a range between about 650° to about 750° C. Accordingly, the variable speed blower 3 is adjusted to maintain the burner air flow in conduit 4 at an effective burner air flow rate which will be in excess of the stoichiometric amount of air required for combustion to maintain the burner outlet temperature in an effective range in response to a burner signal A produced by the burner temperature sensor 17. The variable speed blower 3 may be a single variable speed blower or two blowers driven by variable speed motors manifolded in a conventional manner to provide redundancy for providing the burner air flow in conduit 4. During startup conditions, both variable speed blowers will be employed to supply burner air flow when the hydrogen fuel has not been depleted by the fuel cell and a higher burner air flow is required to maintain the burner temperature in the desired range. Alternatively, the variable speed blower can be provided by a parallel configuration of one or more single speed blowers having a common inlet and outlet and a flow controller to provide the burner air flow as the variable rate demanded to maintain the burner outlet temperature. Independent of the burner air flow, a process air flow in a second conduit, shown as lines 7, 8 and 13, receives a process air flow at a fixed flow rate from a multi-capacity blower 6 and splits the process air flow to direct a portion to a partial oxidation reactor 11 and the remaining portion of the process air flow to a preferential oxidation reactor 12. The multi-capacity blower 6 compresses an air stream in line 2 to provide the process air flow in the second conduit (7, 8 and 13) to provide the process air flow to the partial oxidation reactor 11 and to the preferential oxidation reactor 12. The multi-capacity blower 6 may be a single blower with discrete speed settings or a plurality of single speed blowers disposed in a parallel configuration with a common inlet and a common outlet to provide the process air flow at the desired fixed process air rate. Accordingly, the process air flow is supplied by compressing a second air stream in line 2 to a discrete, incrementally fixed fraction of the total capacity of the multi-capacity blower 6 which is selected in response to a capacity signal C proportional to the demand for hydrogen from the fuel processor or proportional to a demand for electric power from the fuel cell. The process air flow is split by the second conduit whereby a portion of the process air flow is passed in lines 7 and 8 to a reactor air control valve 9. The reactor air control valve 9 has a valve inlet 19 for receiving the portion of the process air flow from the second conduit, and a valve outlet 20 for providing the portion of the process air flow to the partial oxidation reactor 11, via a third conduit 21. A partial oxidation temperature sensor 18 measures the temperature of the effluent from the partial oxidation reactor 11 in line 16 prior to passing the partial oxidation reactor effluent to downstream shift (not shown) and preferential oxidation reactor 12. The effluent from the preferential oxidation reactor 12 is passed to the fuel cell (not shown) for conversion to electric power. The reactor air control valve 9 has a control body for adjusting the portion of the process air flow passed to the partial oxidation reactor 11 in response to a reactor temperature signal B. The remaining portion of the process air flow is passed via lines 7 and 13 to a flow restrictor 14, such as a restriction orifice which can be fixed or adjustable, and from the flow restrictor the remaining portion of the process air flow is passed to the preferential oxidation reactor 12 via conduit 15. According to the fuel processor control system apparatus of the present invention, on a demand to increase the capacity of the multi-capacity blower 6 corresponding to an increased demand for electric power, the speed of the multi-capacity blower 6 is initially set at a speed setting above the next highest discrete capacity for a period of time equal to an effective oxidation time to compensate for a carbon monoxide concentration peak in the partial oxidation reactor effluent. At the end of the effective oxidation time, the speed setting of the multi-capacity blower 6 is allowed to reach the desired discrete blower capacity.

EXAMPLE

Figure 2:
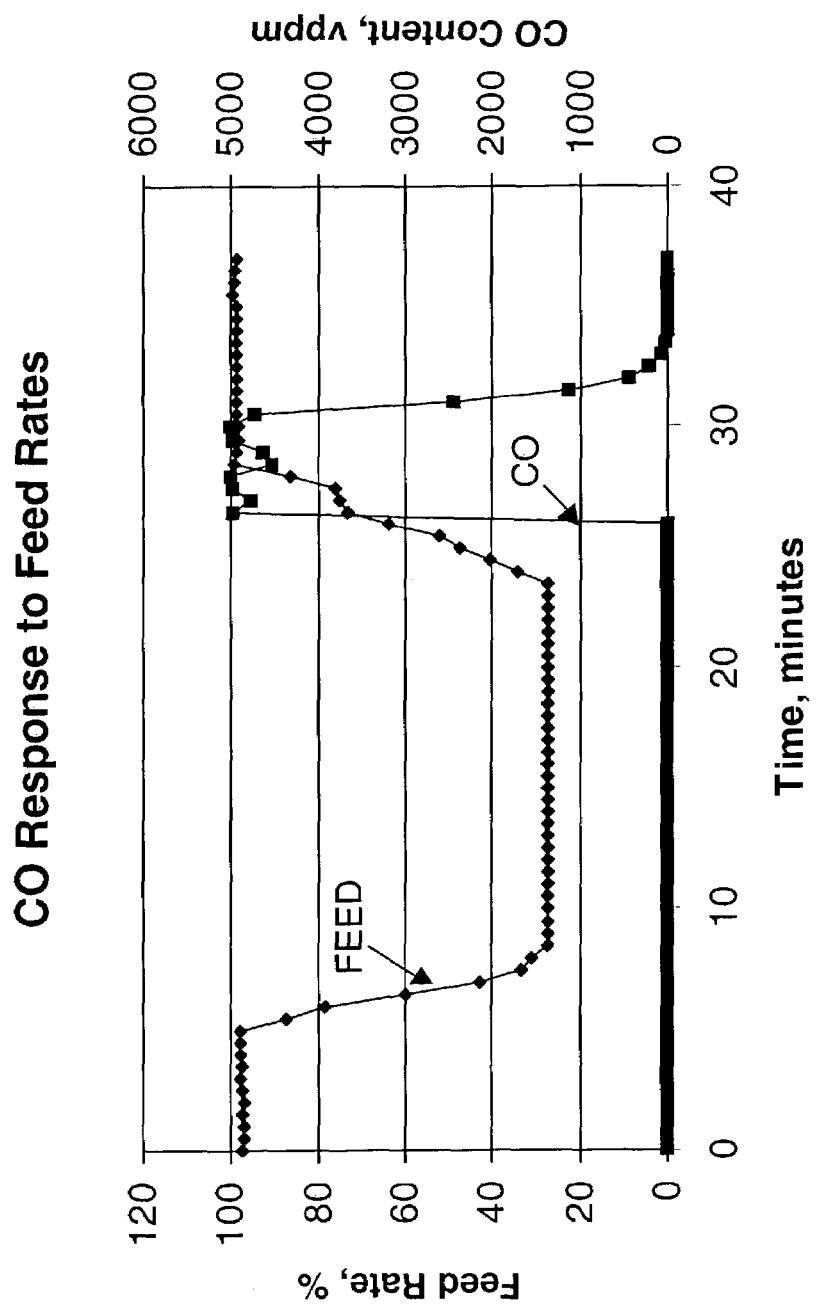
FIG. 2 is a chart illustrating the carbon monoxide response to feed rate changes.

A fuel processor consisting of a partial oxidation reactor, a preferential oxidation reactor and a burner zone as disclosed in U.S. Pat. No. 6,190,623 B1 was operated on a natural gas feedstock at a feed rate equivalent to about 100 percent of the design throughput to provide a hydrogen fuel stream for use in a fuel cell to generate electric power. In order to prevent damage to a downstream fuel cell, the concentration of carbon monoxide in the hydrogen fuel gas was maintained at 5 ppm-vol. Following a period of stable operation at a feed rate of about 95 percent of design capacity, the feed rate was reduced to about 25 percent of capacity. No variation in the carbon monoxide concentration in the hydrogen fuel was observed during this reduction in the feed rate. Following a period of steady operation at about 25 percent of the design feed rate, the feed rate to the partial oxidation reactor was returned to the previous level of about 95 percent of design capacity. An immediate peak in the carbon monoxide concentration in the hydrogen fuel gas was observed, followed by at least one secondary carbon monoxide concentration peak. The magnitude of the carbon monoxide peaks was greater than 5000 ppm-vol. FIG. 2 illustrates the observed variation in the carbon monoxide concentration in the hydrogen fuel in response to the changes in the feed rate to the partial oxidation reactor.

What is claimed is:

1. A fuel processor control apparatus for a hydrogen production apparatus, said hydrogen production apparatus comprising a partial oxidation reactor; a preferential oxidation reactor; and a process air conduit for supplying a process air flow to the partial oxidation reactor and the preferential oxidation reactor; the control apparatus comprising:

(a) multi-capacity blower having a feed inlet for receiving a process air stream and a feed outlet for producing the process air flow at a plurality of fixed air flow rates, the process air flow being incrementally fixed in response to a demand for hydrogen;

(b) a first conduit for connecting the feed outlet of the multi-capacity blower to the partial oxidation reactor;

(c) a second conduit for connecting the second conduit to the preferential oxidation reactor; and (d) a reactor air control valve in at least one of the first conduit and second conduit which has a valve inlet for receiving a portion of the process air flow, a valve outlet, and a control body for adjusting the portion of the process air flow in response to the hydrogen demand.

2. The fuel processor control apparatus of claim 1 further comprising a control body for the multi-capacity blower which, in response to an increase in demand for hydrogen, overcompensates the air flow rate for a period of time sufficient to avoid an undue peak in carbon monoxide concentration in the preferential oxidation reactor.

3. The fuel processor control apparatus of claim 1 further comprising a reactor temperature sensor operable to measure the partial oxidation temperature and produce a reactor temperature signal; a reactor air control valve in the first conduit having a valve inlet for receiving a portion of the process air flow, a valve outlet for providing said portion of the process air flow to the partial oxidation reactor, and a control body for adjusting the portion of the process air flow in response to the reactor temperature signal.

4. The fuel processor control apparatus of claim 3 wherein the second conduit contains a flow restrictor.

5. The fuel processor control apparatus of claim 1 wherein the multi-capacity blower produces a process air flow in at least three increments between 0 and about 100 percent of a total capacity.

6. The fuel processor control apparatus of claim 1 wherein the flow restrictor is adjustable.

7. The fuel processor control apparatus of claim 1 wherein the multi-capacity blower is operated at a plurality of fixed flow rates selected from the group consisting of 0, 40, 55, 75, and 100 percent of a total capacity.

8. The fuel processor control apparatus of claim 1 wherein the multi-capacity blower operation is characterized by a dead time band about each fixed, discrete capacity.

9. The fuel processor control apparatus of claim 8 wherein the dead time band comprises a band width of less than about 5 percent of the capacity.

10. A process for controlling a hydrogen production apparatus including a partial oxidation reactor and a preferential oxidation reactor, said process comprising:

(a) compressing air in a multi-capacity blower at a fixed, discrete blower capacity to provide a compressed air stream at a first flow rate;

(b) passing a first portion of the compressed air stream to the partial oxidation reactor and therein reacting the first portion of the compressed air stream with a feedstock in the presence of a partial oxidation catalyst to provide a partial oxidation reactor effluent at an effective partial oxidation reactor temperature;

(c) passing a second portion of the compressed air stream to the preferential oxidation reactor; and (d) adjusting the multi-capacity blower to a second fixed, discrete capacity to provide the compressed air stream at a second flow rate in response to a change in demand for hydrogen.

11. The process of claim 10 further comprising using the hydrogen from the fuel processor in a fuel cell to generate electricity and an anode waste gas; compressing a second air stream in a variable speed blower to provide a second compressed air stream; combusting the second compressed air stream in the presence of the anode waste gas to produce a burner effluent stream at a burner temperature; measuring the burner temperature and adjusting the variable speed blower to maintain a desired burner temperature.

12. The process of claim 10 comprising controlling the portion of the first compressed air stream to maintain the effective partial oxidation temperature.

13. The process of claim 10 wherein the discrete blower capacity is increased by a fixed increment of capacity when the demand for electric power is increased.

14. The process of claim 13 further comprising further increasing the multi-capacity blower capacity by an effective percentage of blower capacity for an effective time upon an increase in demand of hydrogen to avoid a peak in carbon monoxide in the preferential oxidation reactor.

15. The process of claim 14 wherein between about 2 and 10 volume percent more air is supplied to the preferential oxidation reactor than would be supplied to the preferential oxidation reactor to maintain the carbon monoxide at a desired concentration.

16. The process of claim 14 wherein the effective oxidation time comprises a time for a carbon monoxide concentration peak in the partial oxidation reactor to pass through the preferential oxidation reactor.

* * * * *